G. G. EARL & A. B. WOOD
REGULATING AND PROPORTIONING THE FEED OF CHEMICALS OR LIKE SUBSTANCES
TO WATER OR OTHER FLUIDS
APPLICATION FILED MAY 10, 1911   2 Sheets—Sheet 2

1,200,324.

Patented Oct. 3, 1916.

WITNESSES:

INVENTOR
George G. Earl
Albert B. Wood
BY
ATTORNEY

UNITED STATES PATENT OFFICE.

GEORGE GOODELL EARL AND ALBERT BALDWIN WOOD, OF NEW ORLEANS, LOUISIANA.

REGULATING AND PROPORTIONING THE FEED OF CHEMICALS OR LIKE SUBSTANCES TO WATER OR OTHER FLUIDS.

1,200,324. Specification of Letters Patent. Patented Oct. 3, 1916.

Application filed May 10, 1911. Serial No. 626,359. REISSUED

*To all whom it may concern:*

Be it known that we, GEORGE G. EARL and ALBERT B. WOOD, both residing at New Orleans, in the parish of Orleans and State of Louisiana, have invented certain new and useful Improvements in Apparatus for Regulating and Proportioning the Feed of Chemicals or like Substances to Water or other Fluids; and we do hereby declare the following to be a full, clear, and exact description of the invention, such as will enable others skilled in the art to which it appertains to make and use the same.

We aim to regulate and proportion the feed of chemicals to fluid mains or other receptacles, such for example as the coagulating medium to water supply. The amount of chemicals supplied should be in proportion to the flow of water in order that neither too much may be introduced or that too little to effectively coagulate the water, be supplied. We place the regulation of this supply under control of the flow of water and provide means controlled by this flow which governs the feed supply.

Our invention will be best understood by reference to the following description when taken in connection with the accompanying drawing showing one specific embodiment thereof, while its scope will be more particularly pointed out in the appended claims.

While we mention more particularly the use of our invention in connection with water supply and chemical feed, it will be evident that it is adapted to be used in connection with any fluid or any kind of feed.

Figure 1:
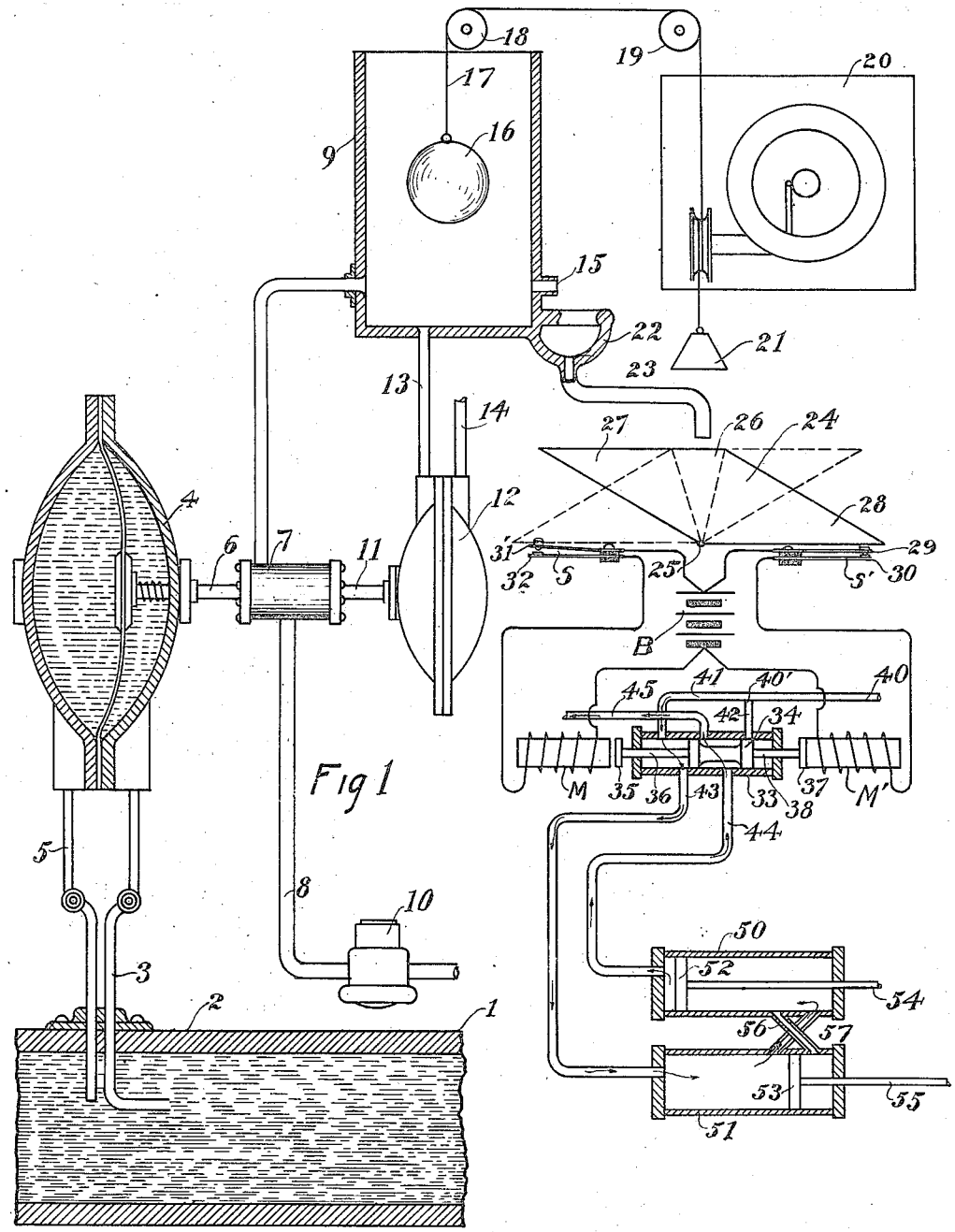
Figure 2:
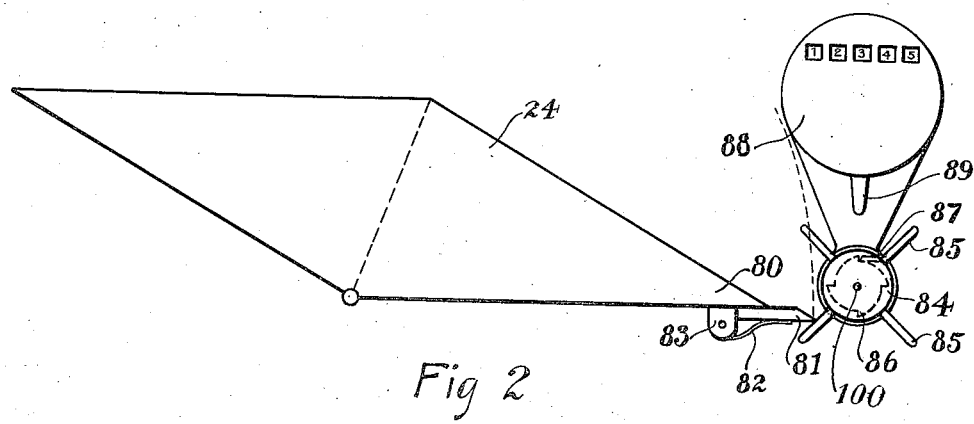
Figure 3:
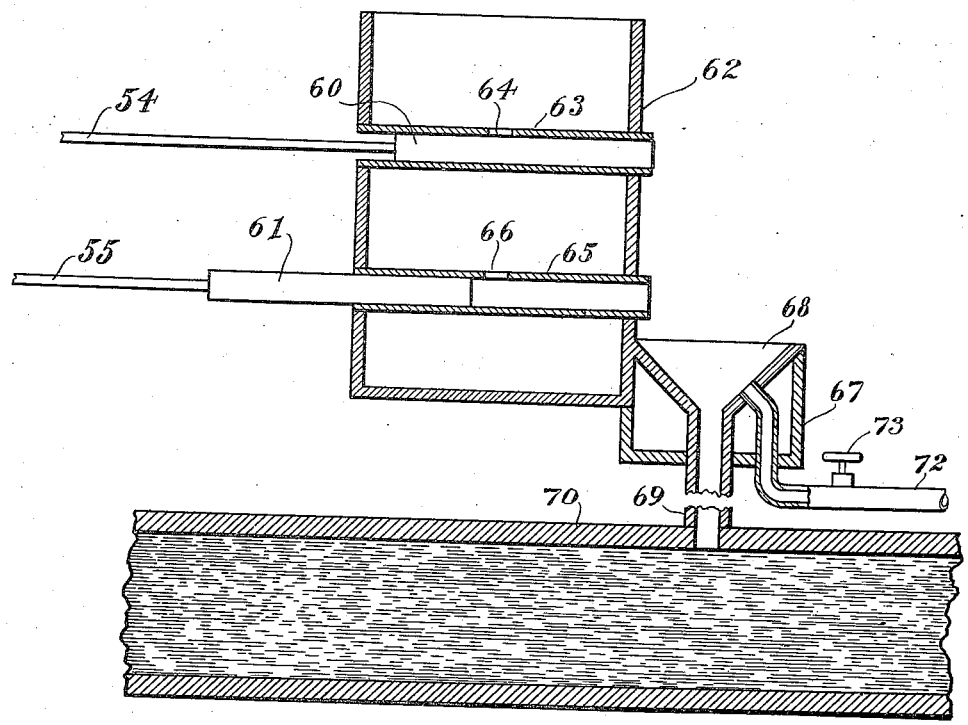

Figure 1 shows our device partly in section and partly in elevation. Fig. 2 shows a detail. Fig. 3 shows the chemical feeding device in section.

Referring now to the drawing, 1 is a water duct or main of any kind through which water may flow, being driven therethrough by some pressure source. The flowing water is adapted to set up two pressures: one known as the static pressure, which is that of the source alone, and a second due to the velocity of the moving fluid. The total pressure exerted by the moving fluid is the resultant of these two pressures.

At 2 we show a Pitot tube which consists of the elbow of a pipe bent at right angles to the main direction of the pipe and extending in a direction opposite to the flow in the main. This is adapted to transmit the compounded static and velocity pressure through a duct 3 to a chest or receptacle 4. 5 is a second duct leading from the main to the chest, 4. This terminates in the main in a straight opening at right angles to the direction of flow and is adapted to transmit the static pressure of the water alone to this chest. This form is known as a piezometer tube. The two parts of the chest in which the said ducts terminate, are separated by a movable partition. The partition is connected by a rod 6 with a balance valve housed in a valve chest which controls the flow of water from a pipe 8 connected with a potential source to a tank 9. This water flows through a meter 10. The balanced valve is connected by a second rod 11 to a second movable partition in a second valve chest 12 employed to house said partition. The rod 11 transmits motion from the second movable partition to the valve; the pipe 13 the pressure in the tank to one side of said partition. A duct 13 leads from the tank 9 to one side of the partition and a second duct 14 leads from the other side to the atmosphere and transmits atmospheric pressure thereto. The pressure transmited through the pipe 13, will be the atmospheric pressure plus the pressure in the tank, while that upon the other side will be the atmospheric pressure alone. The difference will be the pressure in the tank.

Pressure exerting means, such as a spring, is shown at 101 in the casing 4, which exerts a pressure, tending to move the diaphragm in the casing 4 to the left. The pressure of this spring normally is equal to, opposed to and overcomes the pressure exerted by the liquid head in the tank 9, when such head stands at the level of the center of the orifice 15. The set is in equilibrium and the valve in a closed position when such level exists and the pressures on the two sides of the diaphragm in the casing 4 are equal, which, of course, is the condition existing when no water is flowing through either the main 1 or the pipe 8. Assuming that water begins to flow in the main 1, the velocity pressure upon the right-hand side of the diaphragm in the casing 4 will be increased, disturbing the equilibrium of the system and moving said diaphragm to the left. This will open the valve in the casing 7, admitting fluid flowing through the pipe 8 to the tank 9 and building up a head in said tank over the orifice 15, thereby increasing the pressure through the duct 13 on the left-hand side of the diaphragm in the casing 12. This will continue until the forces acting to draw the valve in the casing 7 in opposite directions are equal, thereby creating a new condition of equilibrium of the system and maintaining such in equilibrium until the velocity of the fluid in the main 1 changes again. In case the velocity of the fluid in the main falls, the action will be the reverse of what has just been described. During these operations the atmospheric pressure exerted upon the diaphragm in the casing 12 through the pipe 14 will balance the atmospheric pressure added to the head in the tank 9. At 15 is provided an outlet from the tank. The object of this combination is to provide means to create a flow of fluid, functional to the flow in the main 1. This orifice or outlet is at a point corresponding to no motion of water in the main pipe. The discharge from this orifice will then be exactly proportionate to the quantity of water flowing in the main pipe, and since the supply is equal to the discharge the amount of water recorded by the meter 10, will be some function of the quantity of water flowing in the main pipe. A float 16 is arranged to follow the rise and fall of water in the tank. A cord 17 passes over a pair of pulleys 18 and 19, to a meter 20, which registers the movements of the float. A weight 21 attached to the other end of the cord keeps the same taut. The water flows through the outlet 15 into a basin 22, whence it flows through a pipe 23 and into a reciprocating tank 24. This tank is pivoted at 25 and is adapted to vibrate upon the same. A partition 26 divides the tank into two parts, 27 and 28. When the tank is in one of two positions at which it comes to rest, the water flows into one part and out of the other and vice versa. When sufficient has flowed out of one side and into the other to unbalance the tank, it will move to the other position shown in the drawing in dotted lines. At each of the positions of rest, the tank closes a switch in an electric circuit. These switches are shown at S and S'. When the tank is in the full line position, the springs 29 and 30 of the switch S' are caused to contact, while springs 31 and 32 of the switch S are opened. The switch S' controls a circuit through a generator of electric current B and an electro-magnet M', while the switch S controls a circuit through the same generator and a second electro-magnet M. As the tank vibrates, these magnets will be energized and deënergized, and the faster the tank vibrates, the faster the cycle will be repeated. The vibrations of the tank will be proportional to the flow of water from the tank 9.

33 is a valve chest, in which is mounted a valve 34 which is adapted to reciprocate in this chest. A rod 36 connects this valve to an armature 35 of the magnet M, while a second rod 38 connects the other end of the valve to an armature 37 of the magnet M'. Through these means the valve vibrates as the magnets are energized and deënergized. A pipe 45 leads from a source of pressure to the valve chest 33, opening therein. The valve 34 is made substantially spool shaped of the well known Pilot type, being of less diameter at the center than at the ends. The ends effectively close the chest and prevent any flow through the chest when the valve is in the neutral position. The pipe 45 enters the valve chest at a position such that the fluid flowing therethrough is discharged in that part of the chest occupied by the center or smaller diameter part of the valve. Two ducts 41 and 42 serve as waste pipes. One taps the chest near one end thereof and the other at the other end. The two unite at 40' into the pipe 40. The pipes or ducts 43 and 44 lead to two chambers 50 and 51. A piston 52 is arranged to reciprocate in the chamber 50, while a similar piston 53 likewise reciprocates in the chamber 51. Rods 54 and 55 are connected to the piston 52 and 53 respectively. Diagonal pipes 56 and 57 connect the chambers. The inclination of these pipes is such, that when a piston is in the extreme forward position, it will rest between the orifices of the said ducts. The rods 54 and 55 are adapted to control the supply of chemicals to the water main, and since the vibration of these rods is proportional to the flow of water in the main pipe, the amount of chemicals supplied will be proportional to the water flowing therein.

By taking the number of oscillations of the reciprocating or tapping tank 24, we may arrive at the amount of water which has passed through the orifice 15 and ultimately the amount which flows through the main. In Fig. 2 we show a device to accomplish this; upon one end of this tank a pawl 81 is pivoted at 83; a spring 82 constantly presses this pawl against the bottom of the end 80 of the tank. A wheel 84 is pivoted adjacent this pawl. The four arms 85 projecting from this wheel are in the path of the pawl and at each oscillation of the tank the wheel is given a quarter turn. A ratchet wheel 86 fastened to the shaft 100 of the wheel 84, prevents the main wheel returning. 88 is a registering meter. A pin 89 adapted to operate the meter projects into the path of the pins 85 and is moved to operate the register each time one of the spokes 85 passes it. We may use any form of registering meter known in the art, the one described being shown for the purpose of illustrating our invention.

In Fig. 3 we show the apparatus for forcing the chemicals into the water conduit. The piston rods 54 and 55 carry plungers 60 and 61 on the ends opposite the pistons. 62 is a hopper to hold the chemicals. 63 and 65 are ways in which the plungers work back and forth. The chemicals drop through openings 64 and 66 into these ways. They are ejected into the funnel 68 by the plungers 60 and 61. Water is passed through the pipe 72 into the funnel 68 where it engages the chemicals and carries them through a duct 69 into the main 70. This may be and generally is the same duct as shown at 1. At 67 we show a support for the funnel 68. 73 is a valve which controls 72.

The apparatus of our invention will be better understood from a description of the operation. Suppose that water or some other fluid is flowing in the main pipe 1. The static pressure of this fluid will be conveyed through the duct 5 to one side of the partition in the chest 4. The total pressure will be conveyed through the pipe 3 to the other side. The partition will vibrate in proportion to the variation in the differences between the pressures upon the two sides, influencing the valve in the valve chest 7 accordingly. This valve is also moved in accordance with the movements of the partition in the chest 12, so that the movements are the resultant of the motion which these two partitions tend to impart to it. Water will flow through the pipe 8 to the tank 9 when the valve is opened and this valve being opened wider as the flow in the main pipe increases, the water flowing into the tank will be proportional to that flowing in the main pipe. The water flows from the tank through the pipe 23 to the vibrating tank 24. The number of vibrations made by this tank will be proportional to the amount of water flowing into it and consequently to the flow in the main. The vibration of the tank acting through the electric circuit and the magnets will cause a vibration of the valve 34, which will likewise be proportional to the flow of water in the main. When the valve 34 is in the position shown in the drawing, water will flow through the pipe 45 into the valve chest through duct 44 into the chamber 50, and behind the piston 52 forcing the same forward with the rod 54 and operating the chemical feed. When the piston 52 has passed the orifice of the pipe 56, water will flow through this pipe into the valve chamber 51 and behind the piston 53 forcing the same to the rear carrying the piston rod 55 and operating the chemical feed. The rearward movement of this piston forces any water that may be in the chamber 51 behind 53 through the pipe 43, the valve chest and the duct 41 into 40, and when the valve 34 is in the opposite position, water will flow through 45, the chest 34, the chamber 51 in the reverse direction, forcing 53 forward and 52 rearward, reversing the operation of the parts.

We contemplate using any suitable apparatus for injecting the chemicals into the main which may be operated by the apparatus described, and while we have illustrated and described this particular form of apparatus, it will be apparent to those skilled in the art that numerous and extensive departures from the form and details of this apparatus may be made without departing from the scope of the invention.

We claim:

1. In a device of the class described, the combination of a fluid duct, means to control the introduction of a substance into said duct, a pressure source independent of said duct, a tank and means including a pair of movable members and a valve to regulate the pressure in said tank so that the flow from the source will be proportional to the flow of the fluid in the duct and means operated by the flow of fluid from said tank controlling said first named means.

2. In a device of the class described, the combination of a fluid duct, means to control the introduction of a substance into said duct, a fluid reservoir, a valve adapted to move in proportion to the flow of fluid in the duct, said valve controlling the flow of fluid into the reservoir, and means operated by the flow of fluid from said reservoir controlling said first named means.

3. In a device of the class described, the combination of a fluid duct, means to introduce a substance into said duct, a movable member adapted to move in proportion to the difference between the static and total pressures in said duct, a valve adapted to be moved in response to the movement of said member, a fluid reservoir, the supply to said reservoir being controlled by said valve and means operated by the flow of fluid from said reservoir controlling the said first named means.

4. In a device of the class described, the combination of a fluid duct, means to introduce a substance into said duct, a movable partition adapted to move in accordance with the differences between the static and total pressures of the fluid in said duct, a fluid reservoir, a valve controlling the flow of fluid into said reservoir, a second movable partition adapted to move in response to the variation in pressure in said reservoir, said valve adapted to move in response to the movements of the two partitions and means operated by the flow of fluid from said reservoir controlling said first named means.

5. In a device of the class described, the combination of a conduit conducting a main flow of fluid, means conducting a second flow, means including a vibratile diaphragm for regulating the second flow proportionately to the first and apparatus controlled by said functional flow for introducing a dry substance to said conduit.

6. In a device of the class described, the combination of a fluid duct, means to introduce a substance into said duct, a fluid reservoir, means governed by the flow of fluid in said duct, controlling the supply to said reservoir, and a vibratile tank controlled by the pressure in the reservoir governing said first named means.

7. In a device of the class described, the combination of a fluid duct, means to introduce a substance into said duct, a fluid reservoir, means controlled by the joint action of the movement of the fluid in said duct and the pressure in said reservoir for controlling the flow of fluid to said reservoir, a reciprocating member operated by the water flowing from said reservoir and a valve controlled by said reciprocating member, said valve controlling the operation of said first named means.

8. In a device of the class described, the combination of a fluid duct, of means to introduce a substance into said duct, said means including a battery of chambers, a piston mounted in each chamber and interconnecting ducts between said chambers, said ducts being independent of each other and providing independent intercommunication between the chambers.

9. In a device of the class described, the combination of a fluid duct, means to introduce a substance into said duct, said means including a pair of chambers, a piston mounted in each chamber adapted to reciprocate from one end of the chamber to the other end and a duct opening into one chamber to the rear of the end position of the piston in that chamber and in the other chamber forward of the end position of the piston in that chamber.

10. In a device of the class described, the combination of a fluid duct, means to introduce a substance into said duct, said means including a pair of chambers, a piston mounted in each chamber, means to move said pistons from one end of said chambers to the other, a duct terminating in one chamber behind the end position of the piston in that chamber and terminating in the other chamber forward of the end position of the piston in said other chamber and a second duct terminating in each chamber in reversed relations with respect to the end positions of said pistons.

11. As a means for feeding a substance to a water main, the combination of a water main, fluid operated means which vibrates in proportion to the flow of water in the main, a plurality of plungers caused to reciprocate by said means, a receptacle for the substance to be introduced to said main, ways for said plungers associated with said receptacle, said ways and said receptacle being connected so that the substance may pass into the ways when the plunger operating therein recedes, and a duct connecting said receptacle and said main, said plungers operating when reciprocated to discharge said substance from said ways into said duct.

12. In a device of the class described, the combination of a main fluid duct through which fluid flows under pressure, a fluid receptacle, a diaphragm in said receptacle dividing it into two compartments, means to convey pressure from said main duct to each of said compartments, said pressures acting on said diaphragm, a second fluid receptacle, a second diaphragm in said second receptacle dividing it into two compartments, means for rigidly connecting said diaphragms together, an auxiliary duct adapted to convey an auxiliary flow, a reservoir into and out of which the fluid through the auxiliary duct flows, means to connect one of the compartments in the second receptacle to atmosphere conveying the atmospheric pressure to one side of the diaphragm in the second receptacle, means to convey the pressure in the reservoir to the other compartment in the second receptacle and to the other side of the diaphragm therein, a valve in the auxiliary duct controlled by said diaphragm and regulating the pressure in the reservoir, means for introducing a chemical to the main duct and apparatus whose operation is controlled by the pressure in said reservoir for regulating the introduction of the chemical to the main duct.

13. In a device of the class described, the combination of a fluid duct, means to introduce a substance into said duct, electrical means controlling said first named means, and mechanism including a vibratory tank governed by the flow of fluid in said duct governing said electrical means.

14. In a device of the class described, the combination of a fluid duct, means to control the introduction of a substance into said duct, a pressure source independent of said duct, a tank and means including a movable member, a valve and interconnecting means to regulate the pressure in said tank so that the flow from the source will be proportional to the flow of the fluid in the duct, and means operated by the flow of fluid which passes through said tank controlling said first named means.

15. In a device of the class described, the combination of a fluid duct, means including a fluid reservoir to introduce a substance into said duct, a movable member adapted to move in proportion to the difference between the static and total pressure in said duct, a valve adapted to be moved in response to the movement of said member, the supply to said reservoir being controlled by said valve and means operated by the flow of fluid which passes through said reservoir controlling said first named means.

16. In a device of the class described, the combination of a fluid duct, means to introduce a substance into said duct, a movable partition adapted to move in accordance with the difference between the static and total pressures of the fluid in said duct, a fluid reservoir, a valve controlling the flow of fluid into said reservoir, a second movable partition adapted to move in response to the variation in pressure in said reservoir, said valve adapted to move in response to the movements of the two partitions and means operated by the flow of fluid through said reservoir controlling said first named means.

17. In a device of the class described, the combination of a main conduit through which fluid may flow under pressure, a pressure chamber, a movable partition in said chamber dividing the chamber into two cells, a duct connecting the conduit to one of said cells adapted to convey the static pressure of the fluid in the conduit to said cell, a second duct connecting the conduit with the other of said cells for conveying the velocity pressure from said conduit to the other of said cells, a fluid reservoir, a second pressure chamber, a second movable member in said second chamber, dividing said second chamber into two pressure cells, a duct connecting said reservoir with one of the pressure cells in the second chamber, a second duct connecting the atmosphere with the other cell in the second chamber, a third duct, a valve controlling the flow in the third duct, means to connect said valve to each of said movable members, independent means for exerting pressure on the first-named movable member, a source of pressure for creating a flow through the third duct regulated by said valve and mechanism controlled by the flow through the third duct for introducing to said conduit a dry substance in proportion to the flow of fluid through the conduit.

In testimony hereof, we hereunto affix our signatures in the presence of two witnesses, this 1st day of April, 1911.

GEORGE GOODELL EARL.
ALBERT BALDWIN WOOD.

Witnesses:
GUS MANBERRET,
C. ARTHUR BROWN.